(12) United States Patent
Simko (10) Patent No.: US 10,750,732 B2
(45) Date of Patent: Aug. 25, 2020

(54) HORIZONTAL BAIT TUBE

(71) Applicant: Joseph Michael Simko, North Palm Beach, FL (US)

(72) Inventor: Joseph Michael Simko, North Palm Beach, FL (US)

(*) Notice: Subject to any disclaimer, the term of this patent is extended or adjusted under 35 U.S.C. 154(b) by 547 days.

(21) Appl. No.: 15/452,083

(22) Filed: Mar. 7, 2017

(65) Prior Publication Data

US 2017/0290315 A1    Oct. 12, 2017

Related U.S. Application Data

(60) Provisional application No. 62/276,721, filed on Jan. 8, 2016.

(51) Int. Cl.
| | |
|---|---|
| *A01K 97/05* | (2006.01) |
| *A01K 63/04* | (2006.01) |
| *A01K 63/02* | (2006.01) |
| *B63B 35/26* | (2006.01) |

(52) U.S. Cl.
CPC .............. *A01K 97/05* (2013.01); *A01K 63/02* (2013.01); *A01K 63/042* (2013.01); *A01K 63/047* (2013.01); *B63B 35/26* (2013.01)

(58) Field of Classification Search
CPC ......... A01K 97/05; A01K 97/04; A01K 63/02
USPC ................ 43/55–57; 119/201–203, 226, 228
See application file for complete search history.

(56) References Cited

U.S. PATENT DOCUMENTS

| | | | | | |
|---|---|---|---|---|---|
| 485,422 | A | * | 11/1892 | McGray ................. | A01K 63/02 119/202 |
| 636,381 | A | * | 11/1899 | Hamel .................... | A01K 97/04 43/55 |
| 884,140 | A | * | 4/1908 | Erlwein ................. | A01K 63/02 119/201 |
| 1,552,063 | A | * | 9/1925 | Kuehn ................... | A01K 61/17 119/252 |
| 1,639,555 | A | * | 8/1927 | Clark ..................... | A01K 63/02 119/201 |

(Continued)

FOREIGN PATENT DOCUMENTS

| | | | |
|---|---|---|---|
| CA | 2548681 A1 * | 6/2005 | ............. A01K 63/02 |
| DE | 3710671 A1 * | 10/1987 | ............. A01K 97/04 |

(Continued)

*Primary Examiner* — Darren W Ark
(74) *Attorney, Agent, or Firm* — Ingram IP Law, P.A.

(57) ABSTRACT

A system is provided that promotes ram ventilation for aquatic animals stored therein. The system includes a horizontally oriented container that maintains fluid flow in one predominant direction with a first end of the horizontally oriented container receiving a first volume of fluid and a second end expelling a second volume of fluid. The second end is provided at an opposite side of the horizontally oriented container than the first end. A slot is provided that extends along a lengthwise direction of the horizontally oriented container between the first and second ends. The slot is positioned along an upper portion of the horizontally oriented container. For example, if the horizontally oriented container is tube-shaped, the slot is provided at an uppermost point on the circumference of a horizontally oriented tube directly across from a point on the tube that contacts an underlying surface such a transom of the fishing vessel.

17 Claims, 7 Drawing Sheets

(56) References Cited

U.S. PATENT DOCUMENTS

| | | | | | |
|---|---|---|---|---|---|
| 2,091,695 | A | * | 8/1937 | Thuma | A01K 63/02 119/202 |
| 2,302,336 | A | * | 11/1942 | MacDonald | A01K 63/02 119/214 |
| 2,316,607 | A | * | 4/1943 | MacDonald | A01K 63/02 119/201 |
| 2,482,315 | A | * | 9/1949 | Bennett | A01K 97/20 43/55 |
| 2,531,551 | A | * | 11/1950 | Brecht | A01K 97/05 43/4 |
| 2,680,424 | A | * | 6/1954 | Brown | A01K 63/02 119/203 |
| 2,686,383 | A | * | 8/1954 | Rubey, Jr. | A01K 97/05 43/55 |
| 3,076,432 | A | * | 2/1963 | Werner | A01K 63/02 119/203 |
| 3,098,312 | A | * | 7/1963 | Shannon | A01K 97/04 43/4 |
| 3,245,172 | A | * | 4/1966 | Hawks | A01K 97/04 43/55 |
| 3,367,061 | A | * | 2/1968 | Primmer | A01K 63/02 43/55 |
| 3,541,722 | A | * | 11/1970 | Garrison | A01K 83/06 43/66 |
| 3,727,579 | A | * | 4/1973 | Lee | B63B 25/26 119/201 |
| 3,815,546 | A | * | 6/1974 | Plante | A01K 61/59 119/210 |
| 3,916,833 | A | * | 11/1975 | Serfling | A01K 61/59 119/210 |
| 4,007,709 | A | * | 2/1977 | Wishner | A01K 61/59 119/210 |
| 4,089,298 | A | * | 5/1978 | Wilson | A01K 63/02 119/201 |
| 4,205,625 | A | * | 6/1980 | Muller-Feuga | A01K 61/60 119/221 |
| 4,279,218 | A | * | 7/1981 | Brinkworth | B65D 85/50 119/200 |
| 4,297,804 | A | * | 11/1981 | Weld | A01K 97/05 43/55 |
| 4,357,902 | A | * | 11/1982 | Sheldon | A01K 63/02 119/202 |
| 4,428,145 | A | * | 1/1984 | Wheeler | A01K 63/00 43/55 |
| 4,455,966 | A | * | 6/1984 | Knowles | A01K 63/02 119/203 |
| 4,559,902 | A | * | 12/1985 | Mason | A01K 63/042 119/209 |
| 4,815,411 | A | * | 3/1989 | Burgess | A01K 63/02 114/255 |
| 4,844,012 | A | * | 7/1989 | Jerrett | G02B 6/4401 119/203 |
| 4,965,955 | A | * | 10/1990 | Campbell | A01K 63/02 119/201 |
| 5,005,703 | A | * | 4/1991 | Bodker | A01K 63/02 119/201 |
| 5,010,836 | A | * | 4/1991 | Riviezzo | A01K 63/02 114/255 |
| 5,085,879 | A | * | 2/1992 | Elbaz | B65D 1/34 119/204 |
| 5,117,777 | A | * | 6/1992 | Takasugi | A01K 63/02 119/203 |
| 5,156,111 | A | * | 10/1992 | Heggelund | A01K 63/02 119/218 |
| 5,165,198 | A | * | 11/1992 | Kilian | A01K 97/05 383/100 |
| 5,218,923 | A | * | 6/1993 | LaRosa | A01K 63/02 119/201 |
| 5,220,880 | A | * | 6/1993 | Alworth | A01K 63/02 119/203 |
| 5,272,830 | A | * | 12/1993 | Levin | A01K 97/20 224/920 |
| 5,305,711 | A | * | 4/1994 | Sharber | A01K 79/02 119/215 |
| 5,377,622 | A | * | 1/1995 | Lauttenbach | A01K 63/00 119/200 |
| 5,406,740 | A | * | 4/1995 | Wilkin | A01K 97/05 119/203 |
| 5,555,845 | A | * | 9/1996 | Flynn | A01K 63/02 119/201 |
| 5,588,396 | A | * | 12/1996 | Yoshida | A01K 63/006 119/252 |
| 5,632,220 | A | * | 5/1997 | Vento | A01K 63/042 114/255 |
| 5,722,345 | A | * | 3/1998 | Nagaura | A01K 63/02 119/203 |
| RE35,895 | E | * | 9/1998 | Bass, Jr. | A01K 63/02 119/203 |
| 6,237,535 | B1 | * | 5/2001 | LaRosa | A01K 63/02 119/201 |
| 6,352,051 | B1 | * | 3/2002 | Wang | A01K 61/17 119/252 |
| 6,640,749 | B1 | * | 11/2003 | Monnier | A01K 63/02 119/201 |
| 6,712,022 | B2 | * | 3/2004 | Fullerton, III | A01K 63/02 119/201 |
| 7,222,585 | B2 | * | 5/2007 | Jablonsky | A01K 61/59 119/211 |
| 7,328,813 | B2 | * | 2/2008 | Pfister | A01K 97/04 220/507 |
| 7,597,918 | B2 | * | 10/2009 | Rijnbeek | A23B 4/06 426/129 |
| 7,690,330 | B2 | * | 4/2010 | Miller | A01K 63/04 119/228 |
| 8,813,685 | B2 | * | 8/2014 | Vento | A01K 61/10 119/226 |
| 9,374,986 | B2 | * | 6/2016 | Sheriff | A01K 63/042 |
| 9,560,842 | B2 | * | 2/2017 | Athey | A01K 97/05 |
| 2006/0213110 | A1 | * | 9/2006 | Nhou | A01K 83/06 43/41 |
| 2010/0206240 | A1 | * | 8/2010 | Vento | A01K 61/10 119/247 |
| 2011/0209667 | A1 | * | 9/2011 | Day | A01K 63/02 119/201 |
| 2013/0326930 | A1 | * | 12/2013 | Reyes | A01K 97/04 43/54.1 |
| 2014/0345186 | A1 | * | 11/2014 | Tarver | A01K 97/05 43/44.99 |
| 2017/0027137 | A1 | * | 2/2017 | Fagiano | A01K 63/02 |

FOREIGN PATENT DOCUMENTS

| | | | | |
|---|---|---|---|---|
| GB | 2500732 | A * | 10/2013 | |
| JP | 01243934 | A * | 9/1989 | |
| JP | 03139230 | A * | 6/1991 | |
| JP | 03292840 | A * | 12/1991 | |
| JP | 06007055 | A * | 1/1994 | |
| JP | 07243741 | A * | 9/1995 | |
| JP | 08131038 | A * | 5/1996 | |
| JP | 2002136244 | A * | 5/2002 | A01K 63/02 |
| JP | 2011055809 | A * | 3/2011 | |
| JP | 2014027914 | A * | 2/2014 | |
| JP | 2019050793 | A * | 4/2019 | |
| KR | 20080029361 | A * | 4/2008 | |
| WO | WO-9200667 | A1 * | 1/1992 | A01K 63/02 |
| WO | WO-0235922 | A1 * | 5/2002 | A01K 63/02 |
| WO | WO-2005055705 | A1 * | 6/2005 | A01K 63/02 |

* cited by examiner

HORIZONTAL BAIT TUBE

CROSS-REFERENCE TO RELATED APPLICATIONS

This application claims priority to U.S. Provisional Application 62/276,721, filed on Jan. 8, 2016, the complete disclosure of which is incorporated herein by reference in its entirety.

FIELD OF THE TECHNOLOGY

The technology relates to containers for keeping fish alive, more particularly the technology relates to containers for keeping fish alive while on fishing vessels, still more particularly the technology relates to tube-shaped containers for keeping fish alive, still more particularly the technology relates to tube-shaped containers with a longitudinal slot for keeping fish alive while on fishing vessels, and still more particularly the technology relates to horizontally oriented tube-shaped containers with a longitudinal slot for keeping fish alive while on a fishing vessel.

BACKGROUND OF THE TECHNOLOGY

Containers or tanks are commonly used on sport and commercial fishing vessels to keep baitfish and caught fish alive. Bait tanks may be designed to hold large volumes of fluid or water such as several hundred gallons of water. These bait tanks typically are open or non-partitioned containers that allow water stored therein to churn when fishing vessels are subjected to directional changes or vertical motions such as those caused by steering a vessel, navigating surf, and/or maneuvering shifting tidal currents. These bait tanks are usually fed through a pump that continuously circulates new water and includes a drain for removing the old water with metabolic waste to the exterior water source.

Baitfish that are kept in these conventional bait tanks are exposed to adverse conditions including, for example, exposure to circulating currents from the pump and exposure to the churning currents that result from the directional changes and/or vertical motions of the fishing vessel. The baitfish expend considerable amounts of energy breathing and swimming under these adverse conditions. By the time fishing vessels equipped with conventional bait tanks arrive at fishing destinations, many baitfish are exhausted or deceased. The deceased baitfish are discarded to avoid fouling the tank water. The exhausted baitfish are ineffective at attracting desired predators because they produce minimal splashing and movement when bridled to a hook. This leaves only a minority of the original baitfish having sufficient energy to attract desired predators.

One drawback of conventional bait tanks is that baitfish become exhausted and may die due to adverse condition such as changing current flows. Another drawback of conventional bait tanks is that any surviving baitfish are typically exhausted and disoriented, which are not desired qualities for attracting predators. Other drawbacks exist.

Baitfish that are kept in these conventional bait tanks are exposed to adverse conditions including, for example, exposure to circulating currents from the pump and exposure to the churning currents that result from the directional changes and/or vertical motions of the fishing vessel. The baitfish expend considerable amounts of energy breathing and swimming under these adverse conditions. By the time fishing vessels equipped with conventional bait tanks arrive at fishing destinations, many baitfish are exhausted or deceased. The deceased baitfish are discarded to avoid fouling the tank water. The exhausted baitfish are ineffective at attracting desired predators because they produce minimal splashing and movement when bridled to a hook. This leaves only a minority of the original baitfish having sufficient energy to attract desired predators.

One drawback of conventional bait tanks is that baitfish become exhausted and may die due to adverse condition such as changing current flows. Another drawback of conventional bait tanks is that any surviving baitfish are typically exhausted and disoriented, which are not desired qualities for attracting predators. Other drawbacks exist.

DESCRIPTION OF THE TECHNOLOGY

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure and are intended to include, but are not necessarily limited to, the things so described.

The terms "connected" and "coupled" can be such that the objects are permanently connected or releasably connected. The term "substantially" is defined to be essentially conforming to the thing that it "substantially" modifies, such that the thing need not be exact. For example, substantially 2 inches (2") means that the dimension may include a slight variation.

The technology described herein may be employed to provide an improved container that maintains healthy baitfish. Breathing is a vital activity and a large energy consumer for fish. Some fish have adapted two breathing modes depending on conditions of their surroundings. These include ram ventilation and branchial or active pumping. Branchial pumping is less efficient and is typically performed when conditions do not allow for ram ventilation. Ram ventilation requires fish to swim with an open mouth in order to force water across their gills. Alternatively, fish may employ ram ventilation while stationary by orienting their open mouth into a predominant current flow.

Conventional bait tanks such as those provided on fishing vessels are not designed with water current flows that allow fish to maintain ram ventilation. Instead, conventional bait tanks cause baitfish that are stored for prolonged periods of time to asphyxiate from exhaustion attributed to branchial pumping for long periods of time. What is needed is a container that maintains water current flowing in a single predominant direction to allow baitfish to utilize ram ventilation despite directional changes to a fishing vessel as it navigates and/or bobs on water. Furthermore, a container is needed that allows baitfish to be secured in a selected orientation relative to the predominant water current flow direction. According to one example, the technology includes a tube-shaped container that lays horizontally on a surface to maintain baitfish in a proper orientation relative to a predominant water current flow direction therein. The horizontal tube-shaped container facilitates ram ventilation, which reduces an amount of energy needed by baitfish for breathing. When baitfish travel in fishing vessels equipped with the tube-shaped container described herein, a majority of the baitfish arrive at the fishing destinations in a rested and alert state. The energized baitfish attract desired predators because they produce vigorous splashing and movement when bridled to a hook.

Figure 1:
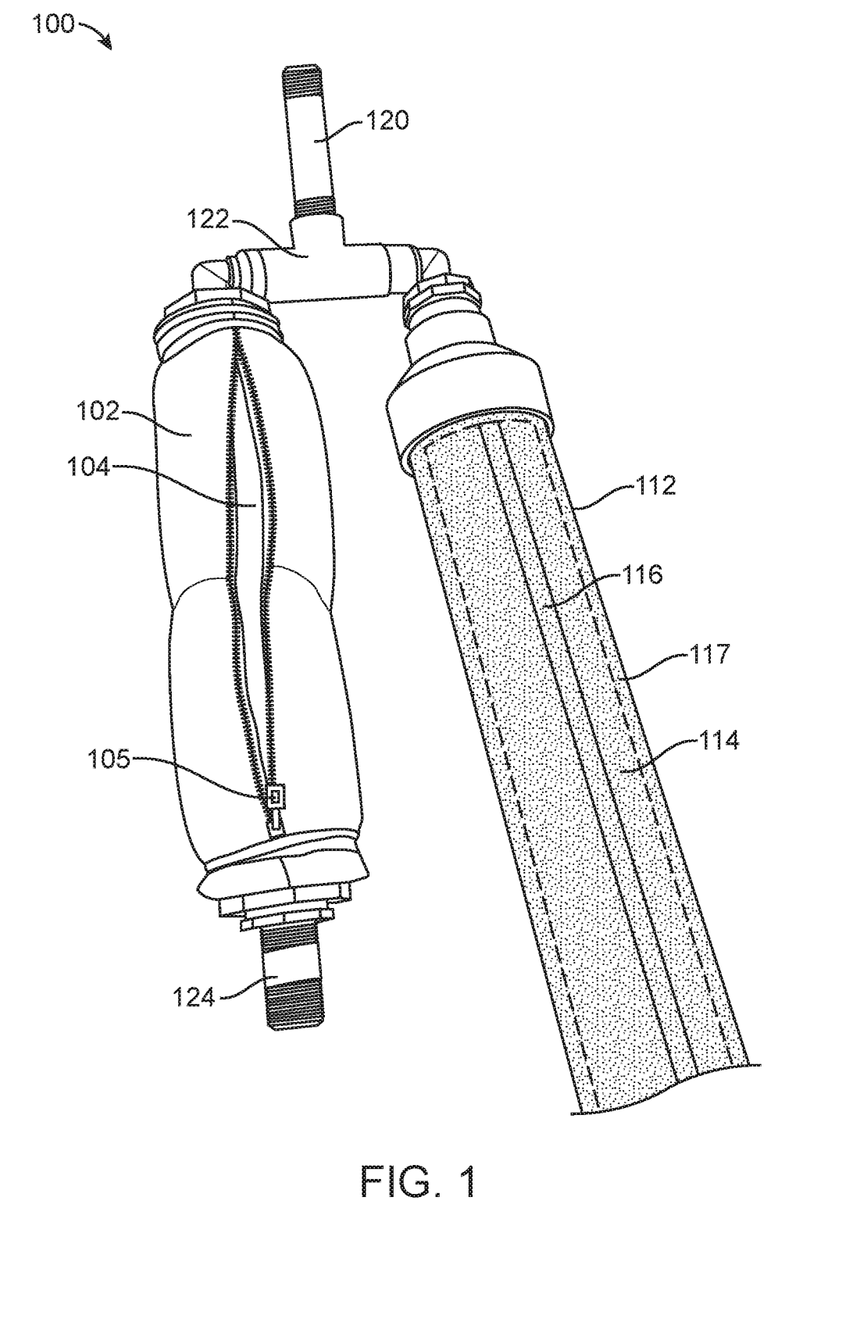
FIG. 1 illustrates a close-up view of the tube-shaped container system according to one example of the technology.

FIG. 1 illustrates a close-up view of a tube-shaped container system 100 that includes tubes 102, 112 arranged in parallel according to one example of the technology. According to one example, tube 102 includes a slot 104 that runs along a longitudinal or lengthwise direction of the tube 102. According to one example, tube 102 may be made from a pliable material such as rubber, polyethylene foam, cloth, styrofoam, neoprene, or the like. According to one example, tube 112 may include a slot 114 that runs along a longitudinal or lengthwise direction of the tube 112. A water pump (not shown) may be fluidly coupled to an inlet side of the tubes 102, 112 via an inlet pipe 120. According to one example, the inlet pipe 120 may be fluidly coupled to a splitter 122 that fluidly couples the tubes 102, 112. One of ordinary skill in the art will readily appreciate that the splitter 122 may fluidly couple three or more tubes arranged in parallel. Alternatively, one of ordinary skill in the art will readily appreciate that the inlet pipe 120 may be fluidly coupled to a single tube. According to one example, an outlet pipe 124 may be fluidly coupled to an outlet side of the tube 102 to recover any fluid or water passing through the tube 102. Furthermore, the outlet pipe 124 may be employed to serially couple a plurality of tubes 102. According to yet another example, the outlet pipe 124 may be capped to force the fluid to exit through the slot 104. According to one example, the tube 102 may include a fastener such as a zipper 105 that allows the slot 104 to be opened or closed to regulate pressure and a fluid flow rate through the tube 102 as described below.

Figure 2:
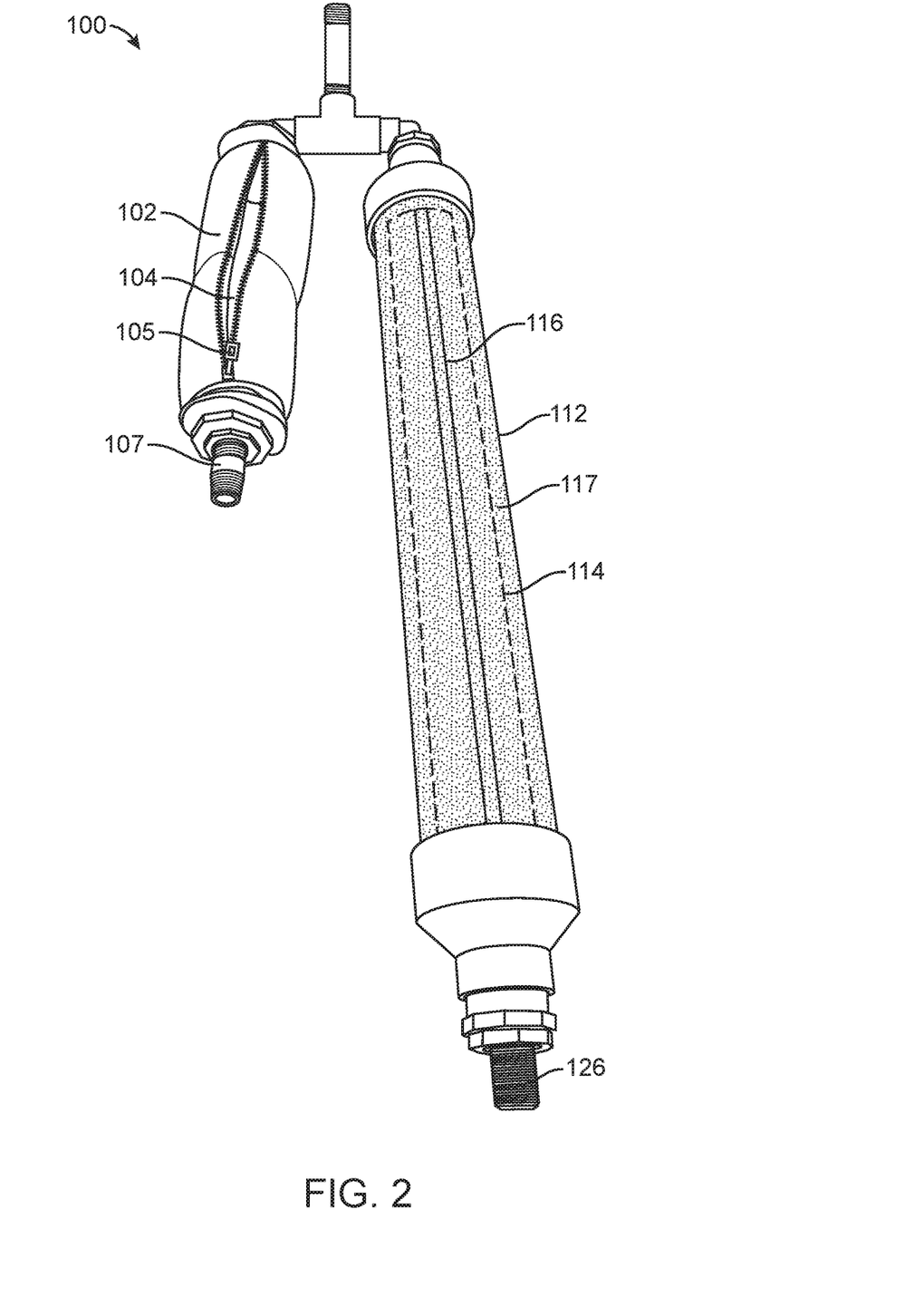
FIG. 2 illustrates a perspective view of the tube-shaped container system of FIG. 1 according to one example of the technology.

FIG. 2 illustrates a perspective view of the tube-shaped container system 100 depicted in FIG. 1. According to one example, the tube 112 may be formed from a rigid material such as plastic, wood, metal, or the like. For example, the tube 112 may be formed from a polyvinyl chloride ("PVC") material. According to one example, the slot 114 formed in the tube 112 may be dimensioned to include a wide gap. For example, the slot 114 may be dimensioned to include a gap that extends up to one-half a circumference of the tube 112. According to one example, the slot 114 may be oriented to face upwards and may be dimensioned to receive baitfish therein. According to one example, a cover 117 may be provided to slip over the tube 112 in order to adjust an effective width of the slot 114. According to one example, the cover 117 may be made of a pliable material such as rubber, polyethylene foam, cloth, styrofoam, neoprene, or the like. According to one example, the cover 117 may be dimensioned to slip over the tube 112. According to one example, the cover 117 may include a slit 116 having a length that substantially coincides with a length of the slot 114. Alternatively, the cover 117 may include a slit 116 having a length that is shorter than a length of the slot 114. When the cover 117 is slipped over the tube 112, the slit 116 may be oriented to rest over the slot 114.

According to one example, the slit 116 may be dimensioned to control a volume of fluid that exits the tube 112. Without the cover 117 in place, a fluid level within the tube 112 is maintained at a height of the slot 114, which may be one half the circumference of the tube 112. According to one example, a size of the slit 116 may be enlarged or restricted to regulate a fluid level within the tube 112, a pressure value within the tube 112, and a volume or amount of fluid exiting the slit 116. Accordingly, the slit 116 may control a volume or amount of fluid flowing through the tube 112 and therefore through the gills of the baitfish. According to one example, the slit size may be adjusted using a fastener such as a zipper, a hook and loop closure, buttons, string, or the like. According to one example, the fastener may be oriented along a same direction as the slit 116, similar to the zipper shown at the slot 104 of tube 102. Alternatively, the fastener may be oriented at an angle relative to the slit 116. For example, the fastener may be oriented substantially perpendicular to the slit 116 such that the slit 116 may be made as wide as the slot 114.

According to one example, the fastener may be adjusted to open or close the slit 116. According to one example, the cover 117 may perform functions such as controlling water pressure inside the tube 112 or maintaining baitfish inside the tube 112, among performing other functions. According to one example, the slit 116 may be closed to increase pressure and a water level inside the tube 112. Alternatively, the slit 116 may be opened to decrease pressure and a water level inside the tube 112. Furthermore, the slit 116 may be adjusted to control a volume of water flowing through the slit 116. For example, the slit 116 may be closed to reduce a volume of water flowing through the slit 116. Alternatively, the slit 116 may be opened to increase a volume of water flowing through the slit 116. With respect to maintaining baitfish inside the tube 112, the slit 116 provides an ingress and egress for the baitfish. According to one example, the cover 117 may be made of a material having elastic characteristics such that the baitfish may be slipped through the slit 116 during the ingress and egress. Furthermore, the cover 117 may maintain the baitfish within the tube even when the slit 116 is open or unzipped. Otherwise, without the cover 117 positioned over the tube 112, the baitfish could jump from the slot 114, which may be dimensioned to include a wide gap.

According to another example, the cover 117 may be formed in an elongated shape such as a rectangular shape to extend over slot 114 instead of a tubular or sleeve-shape that slides over the tube 112. In this case, the cover 117 may be secured to interior or external surfaces of the tube 112 such that the cover 117 extends over the slot 114. For example, the cover 117 may be secured to interior or external surfaces of the tube 112 using fastening mechanisms such as pins, screws, clamps, hook and loop, rivets, epoxy, or the like. According to another example, an inside surface of the tube 112 may be lined with a pliable material such as rubber, polyethylene foam, cloth, styrofoam, neoprene, or the like, to provide padding for the baitfish or to provide a soft surface to secure the baitfish while therein. For example, a bridled baitfish may be secured to the cover 117 or to the lining using a hook or the like in order to maintain its position within the tube 112. According to one example, the tube 112 may include an outlet pipe 126 that is fluidly coupled to an outlet side of the tube 112 in order to recover any water passing there through. According to one example, the outlet pipe 126 may be employed to serially couple a plurality of tubes 112. According to another example, the outlet pipe 126 may be capped to force the fluid to exit through the slit 116.

Figure 3A:
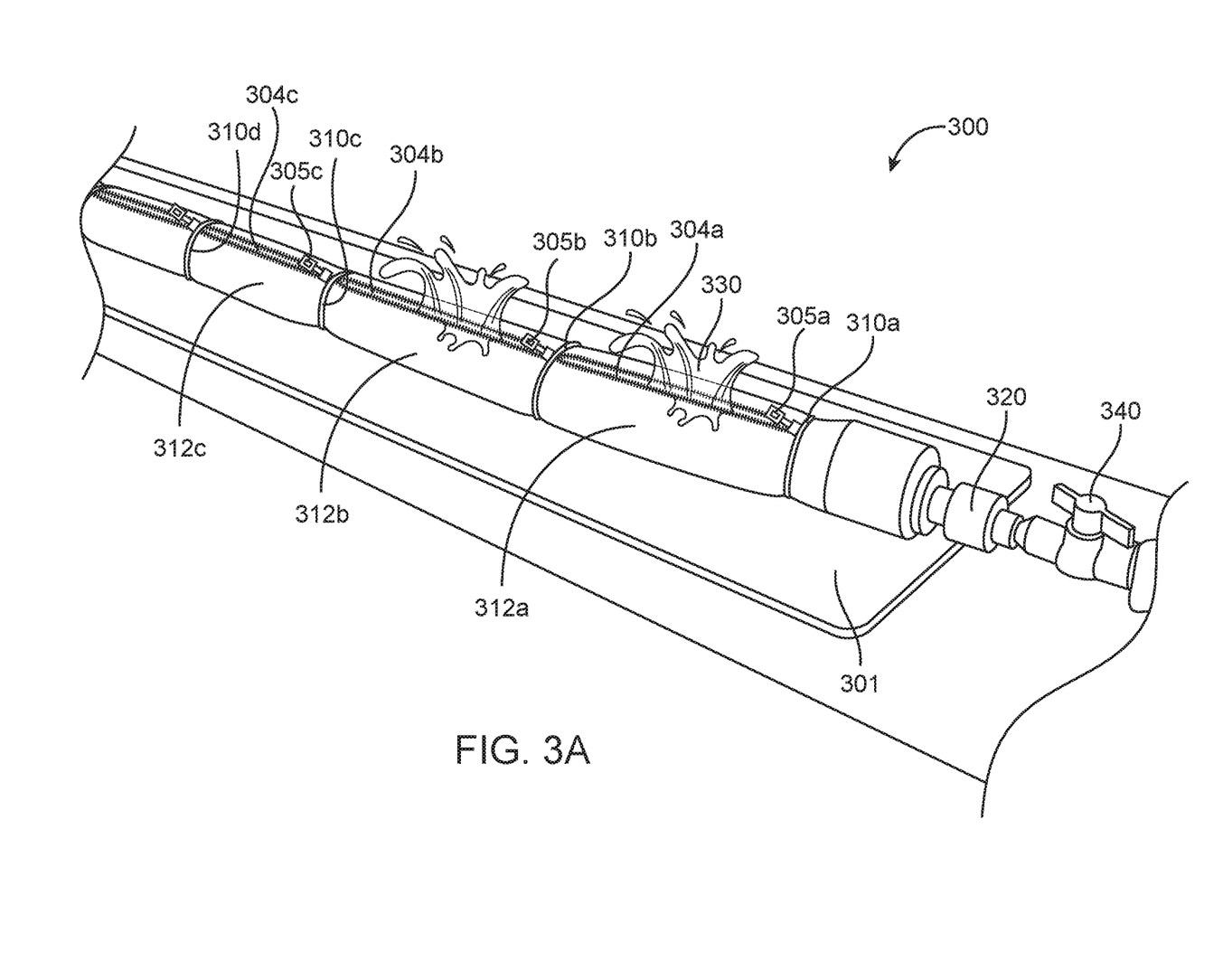
FIG. 3A illustrates a tube-shaped container system according to another example of the technology.

FIG. 3A illustrates one example of a horizontal tube-shaped container system 300 operated in an environment such as across a transom 301 of a fishing vessel. The horizontal tube-shaped container system 300 also may be operated in other environments such as a livewell compartment, among other locations. According to one example, the tube-shaped container system 300 may include a plurality serially arranged tube sections 312a-c. According to one example, a plurality of bands 310a-d may be provided to define a length of the serially arranged tube sections 312a-c. According to one example, a plurality of zippers 305a-c may be provided that each slide along and across an entire length of the serially arranged tube sections 312a-c. In this case, the bands 310a-d may be positioned anywhere along the tube sections 312a-c to define a length of each serially arranged tube section 312a-c. For example, the bands 310a-d may be positioned such that each serially arranged section 312a-c is dimensioned to substantially a same length. Alternatively, the bands 310a-d may be positioned such that each serially arranged section 312a-c is dimensioned to different lengths. According to one example, an interior of the tube sections 312a-c may form a continuous passageway such that no physical barriers or divisions exist inside the tube sections 312a-c. In this way, the bands 310a-d may be provided to allow users to customize lengths of the tube sections 312a-c. According to one example, the zippers 305a-c may slide between corresponding bands 310a-d such that each tube section 312a-c may be dimensioned to accommodate baitfish of different sizes. One of ordinary skill in the art will readily appreciate that the number of bands 310a-d may be adjusted to increase or decrease the number of serially arranged tube section 312a-c.

According to one example, each tube section 312a-c may include a corresponding slot 304a-c that runs along a longitudinal or lengthwise direction. The slots 304a-c may perform functions such as relieving water pressure from inside the tube-shaped container system 300 and facilitating insertion and removal of the baitfish therefrom, among performing other functions. According to one example, corresponding zippers 305a-c may be operated to modify a length of the corresponding slots 304a-c. In this way, the zippers 305a-c may regulate an amount or volume of fluid flowing through the tube-shaped container system 300 and accordingly through gills of the baitfish. According to one example, selected slots 304a-c may be closed to increase a fluid pressure in the tube-shaped container system 300. Alternatively, selected slots 304a-c may be opened to decrease the fluid pressure in the tube-shaped container system 300. Furthermore, the slots 304a-c may be adjusted to regulate an amount or volume of water flowing through the tube-shaped container system 300 and therefore through the gills of the baitfish.

According to one example, the tube sections 312a-c retain fluid when the slots 304a-c are closed, which may force more water to pass through the gills of the baitfish. Alternatively, the tube sections 312a-c expel fluid when the slots 304a-c are open, which may cause less water to pass or flow through the gills of the baitfish. According to one example, the technology maintains a flow of water current in a single predominant direction through the tube-shaped container system 300 to allow stationary baitfish to breathe using ram ventilation. According to one example, the baitfish may breathe using ram ventilation despite directional changes provided to a fishing vessel as it navigates and/or bobs on water. In the case when water is expelled from the tube sections 312a-c, it is removed from the tube-shaped container system 300 and does not contribute to a water current that would otherwise require the baitfish to fight changing current directions in a conventional bait tank system.

According to one example, the tube sections 312a-c may be dimensioned to include an inner diameter that is substantially equivalent to a size of the baitfish provided therein such as from the dorsal fin to the pelvic fin. For example, if the baitfish measures 3 inches from the dorsal fin to the pelvic fin, then the inner diameter of the tube sections 312a-c may be designed in a range of 3.5 to 5 inches. By dimensioning the tube sections 312a-c to appropriately fit around the baitfish, more water is forced to pass across the gills and less water volume is provided to circumvent the baitfish. Furthermore, this design maintains water current flowing in a single predominant direction relative to the baitfish despite any directional changes that may occur to a fishing vessel as it navigates and/or bobs on water. A water pump (not shown) may be fluidly coupled to an inlet side of the tube sections 312a-c via an inlet pipe 320. According to one example, the inlet pipe 320 may be fluidly coupled to the tube sections 312a-c.

Figure 3B:
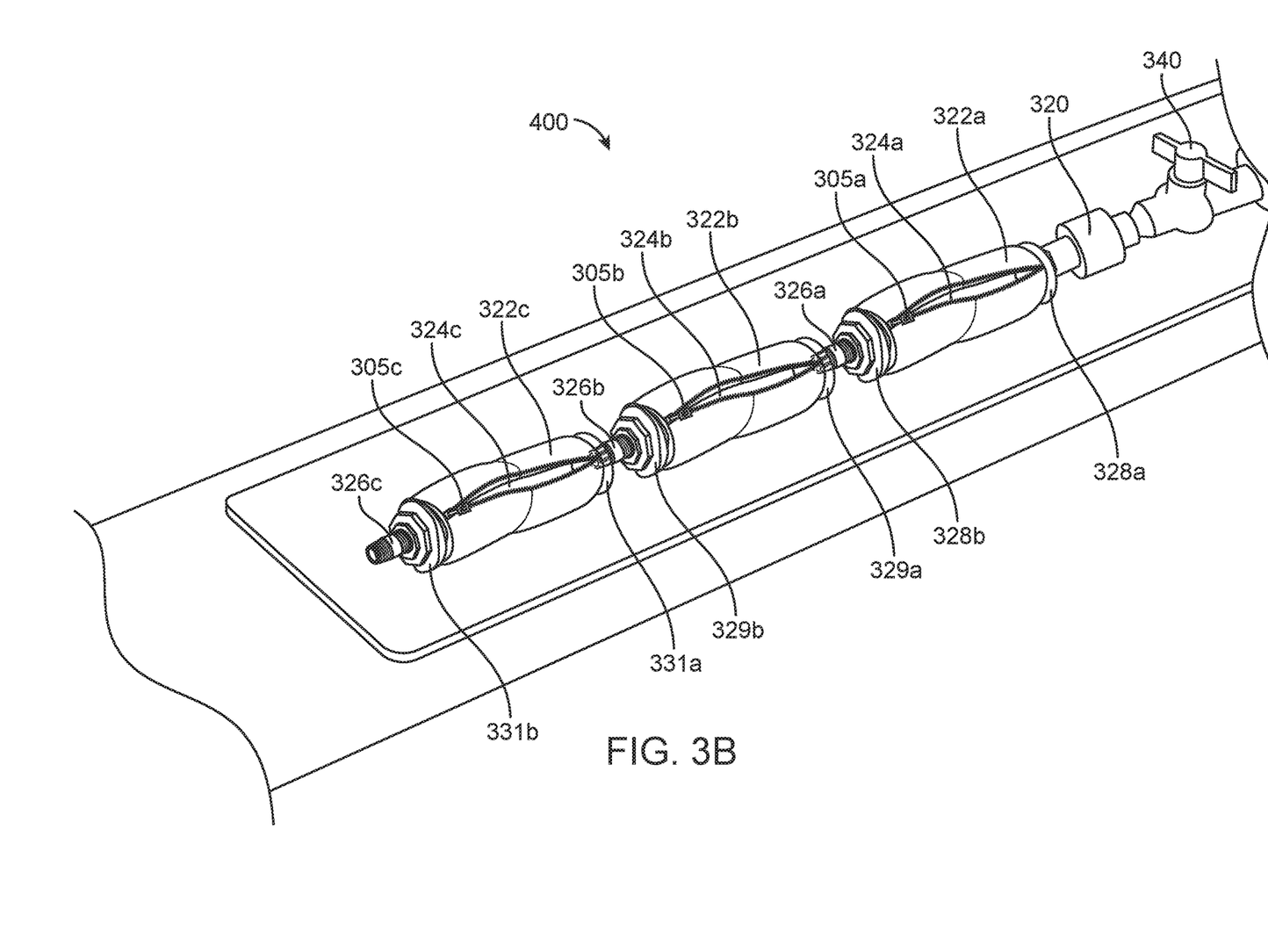
FIG. 3B illustrates a tube-shaped container system according to yet another example of the technology.

FIG. 3B illustrates one example of a horizontal tube-shaped container system 400 in which serially arranged tube sections 322a-c are fluidly coupled by pipes 326a-c. According to one example, the pipes 326a-c may be mechanically coupled to apertures provided at end portions of the tube sections 322a-c. According to one example, the apertures may be formed in a rigid material that forms ends for the tube sections 322a-c. For example, the rigid material may include plastic, wood, metal, or the like. According to one example, a PVC material may be used to form disc-shaped ends that are provided to the tube sections 322a-c. According to one example, the apertures may be formed in the disc-shaped end to receive the pipes 326a-c therethrough. According to one example, the apertures may be threaded such that the pipes 326a-c may be screwed into corresponding disc-shaped ends. One of ordinary skill in the art will readily appreciate that the rigid ends may be formed from any shape. For example, the rigid ends may be formed to match a cross-sectional shape of the tube sections.

According to one example, a first serially arranged section 322a may include a first end 328a that is coupled to the inlet pipe 320, which provides a fluid source. According to one example, the serially arranged tube sections 322a-c may be fluidly coupled to adjacent sections 322a-c through corresponding pipes 326a-c. For example, a first pipe 326a may be inserted through corresponding apertures provided at ends 328b,329a of the first and second tube sections 322a-b. According to one example, the first pipe 326a may be configured to mechanically and fluidly couple a second end 328b of the first tube section 322a to a first end 329a of the second tube section 322b. For example, the first pipe 326a may include threads for mechanically coupling the corresponding ends 328b,329a of the first and second tube sections 322a-b using fastening mechanisms such as nuts or the like. According to one example, the nuts may be tightened from opposite ends of the first outlet pipe 326a to mechanically couple the corresponding ends 328b,329a of the first and second tube sections 322a-b to each other. Alternatively, the apertures in the corresponding ends 328b, 329a may be threaded to eliminate a need for separate nuts.

Furthermore, a second pipe 326b may be inserted through corresponding apertures provided at ends 329b,331a of the second and third tube sections 322b-c. According to one example, the second pipe 326b may be configured to mechanically and fluidly couple a second end 329b of the second tube section 322b to a first end 331a of the third tube section 322c. For example, the second pipe 326b may include threads for mechanically coupling the corresponding ends 329b,331a of the second and third tube sections 322b-c using fastening mechanisms such as nuts or the like. According to one example, the nuts may be tightened from opposite ends of the second pipe 326b to mechanically couple the corresponding ends 329b,331a of the second and third tube sections 322b-c to each other. Alternatively, the apertures in the corresponding ends 328b,329a may be threaded to eliminate a need for separate nuts.

According to one example, a third pipe 326c may be inserted through an aperture provided in a second end 331b of the third tube section 322c. According to one example, the third pipe 326c may be terminated with a cap to prevent fluid flow therethrough. When the cap is in place, the fluid or water may exit the tube sections 322a-c through corresponding slots 324a-c provided in the tube sections 322a-c. Alternatively, in place of the third pipe 326c and cap, the third tube section 322c may have a permanently sealed second or distal end 331b to prevent fluid flow therethrough. For example, the disc-shaped end may be provided without an aperture formed therein. One of ordinary skill in the art will readily appreciate that more or less than three tube sections may be employed and that the final tube section in the series may be terminated to prevent fluid flow therethrough.

According to one example, each serially arranged tube sections 322a-c may include a corresponding slot 324a-c. In this way, the slots 324a-c may be opened and closed on an individual basis to facilitating insertion and removal of the baitfish from individual sections 322a-c of the tube-shaped container system 400, among performing other functions. According to one example, the slots 324a-c may include fasteners such as zippers, hook and loop closures, buttons, string, or the like, that allow for repeated opening and closing. Furthermore, the fasteners allow a size or length of the one or more slots 324a-c to be adjusted in order to control fluid flow through the tube-shaped container system 400.

According to one example, when the third pipe 326c provided in the farthest downstream section 322c is capped or its distal end is permanently sealed, the slot 324c provided in the farthest downstream section 322c may be used to control fluid flow in the upstream sections 322a-b of the tube-shaped container system 400. For the sake of simplicity, the following examples are described with an understanding that the slots 324a-b of the upstream sections 322a-b are fully closed.

According to one example, if the slot 324c is 8 inches in length, a fastener such as a zipper may be used to fully close the slot 324c; to fully open the slot 324c; or to partially open/close the slot 324c. According to one example, the slot 324c associated with the farthest downstream section 322c may be zipped to a fully closed position to prevent fluid from exiting the tube-shaped container system 400. In this case, pressure inside the tube-shaped container system 400 may increase and fluid flow inside the tube-shaped container system 400 may decrease since the slot 324c is fully closed to prevent fluid from exiting the tube-shaped container system 400. Alternatively, the slot 324c may be unzipped to fully open the slot 324c to allow fluid to exit the tube-shaped container system 400. In this case, pressure inside the tube-shaped container system 400 may decrease and fluid flow inside the tube-shaped container system 400 may adjust to potentially match a flow rate into the tube-shaped container system 400.

According to another example, the slot 324c may be partially zipped/partially unzipped to regulate a volume of fluid exiting the tube-shaped container system 400. In this case, a length of the slot 324c may be adjusted to regulate pressure and fluid flow rates inside the tube-shaped container system 400 as desired. While these examples are described with an understanding that the slots 324a-b for upstream sections 322a-b are fully closed, one of ordinary skill in the art will readily appreciate that a length of any of the slots 324a-b for the upstream sections 322a-b may be adjusted to regulate pressure and fluid flow within the individual sections 322a-b and throughout an entirety of the tube-shaped container system 400. Furthermore, one of ordinary skill in the art will readily appreciate that when the individual sections 322a-c are provided in a serial arrangement, fully opening the slot 324a associated with the upstream section 322a of the serial arrangement may decrease pressure and fluid flow in the downstream sections 322b-c of the serial arrangement. For at least this reason, the slot 324c of the farthest downstream section 322c may be typically employed to regulate pressure and fluid flow throughout the tube-shaped container system 400.

According to an alternative example, the third tube section 322c may be terminated using an outlet tube that allows fluid to continually flow through the tube-shaped container system 400, including when all slots 324a-c are fully closed. According to one example, the outlet tube may be secured to the outlet pipe 326c that continually circulate fluid through the tube-shaped container system 400. In this case, the slots 324a-c may be partially zipped/partially unzipped to regulate pressure and fluid flow within the individual sections 322a-c and throughout an entirety of the tube-shaped container system 300.

According to one example, multiple baitfish may be bridled and concurrently deployed on different fishing lines using, for example, one or more fishing kites. While multiple baitfish are deployed, a fishing captain may receive information that identifies a better fishing area located a few miles away from the current fishing location. Before moving the fishing vessel to the new fishing location, all fishing lines must be pulled in. In this case, the baitfish may be returned to the tube-shaped container system 100, 300, 400 for transport to the new fishing location. As discussed above, the baitfish breath by forcing water through their gills such as by swimming and/or pointing their mouth into an oncoming current flow. In this case, the multiple baitfish are bridled with hooks and fishing line leaders when they are removed or separated from the fishing lines for transport to the new fishing location. Conventional bait tanks suffer an additional drawback that the multiple line leaders may become tangled together in an open container during the ride to the new fishing area. In conventional bait tanks, the multiple baitfish are unable to swim when tangled and may perish due to asphyxiation.

The tube-shaped container system 100, 300, 400 overcomes this drawback of conventional bait tanks. The tube-shaped container system 300, 400 allows individual storage of each baitfish within the separate tube sections 312a-c, 302a-c. The walls of the tube sections 312a-c, 302a-c may be made from materials that allow hooks to pass there through. For example, the walls of the tube sections 312a-c, 302a-c may be made from rubber, polyethylene foam, cloth, styrofoam, neoprene, or the like. Accordingly, the bridled baitfish may be attached to a side of the tube sections 312a-c, 302a-c via the hook. For example, the bridled baitfish may be secured in place through the inside of the tube sections 312a-c, 302a-c. In this way, the tube-shaped container system 300, 400 may securely orient the bridled baitfish in a proper orientation relative to the predominant current direction such that their mouth is pointing upstream in order to facilitate ram ventilation.

The serial arrangement of each tube section 312a-c, 302a-c ensures that each baitfish is individually stored so that the line leaders will not tangle together during the ride to the new fishing area. As a result of the tube-shaped container system 300, 400, a majority of the baitfish may be bridled before the fishing vessel departs the dock for a fishing excursion. The tube-shaped container system 300, 400 allows considerably more fishing time, with less time preparing baitfish while on board the fishing vessel. Accordingly, the tube-shaped container system 300, 400 offers several advantages over conventional bait tanks. For example, the tube-shaped container system 300, 400 allows baitfish to be bridled and transported long before they are needed as bait for fishing. The bridled baitfish may be quickly retrieved and deployed on fishing lines when timing is of the essence, such as while competing in fishing tournaments.

FIG. 3A illustrates water 330 splashing out from the slots 304a-b of tube sections 312a-c that provided in a horizontal orientation. According to one example, the tube sections 312a-c may be oriented such that the slots 304a-c are positioned at an uppermost point on the circumference of the tube sections 312a-c. In this orientation, the slots 304a-c are provided directly across from a point on the tube sections 312a-c that contacts an underlying surface such a transom of the fishing vessel. One of ordinary skill in the art will readily appreciate that the tube sections 312a-c may be oriented such that the slots 304a-c are provided at any angle relative to a plane that is substantially perpendicular to the underlying surface and bisects the tube sections 312a-c along its diameter.

As discussed above, the opening of the slots 304a-c may be adjusted to regulate the amount or volume of water flowing through the tube sections 312a-c and therefore through the gills of the baitfish. According to one example, the slots 304a-c may be restricted to increase an amount of water flowing through the tube sections 312a-c. By contrast, the slots 304a-c may be opened to decrease an amount of water flowing through the tube sections 312a-c. Furthermore, the tube-shaped container system 300, 400 is designed to maintain a predominant current flow direction through each of the serially arranged tube sections 312a-c, 302a-c. Any excess water is dispersed through the corresponding slot 304a-c with minimal disruption to the predominant current flow direction. Accordingly, any bridled baitfish may be secured to the corresponding tube section 312a-c, 302a-c using a hook or the like to maintain its position within the corresponding tube sections 312a-c, 302a-c. In this way, the stationary baitfish may employ ram ventilation while expending minimal energy since they are not fighting changing current flow directions. Furthermore, any bridled baitfish secured to the tube sections 312a-c, 302a-c are expending minimal energy since they are not needing to re-orient themselves to allow water to flow through their gills for ram ventilation.

With reference to FIGS. 3A and 3B, a pressure valve 340 may be used to further control the amount or volume of water flowing through the tube sections 312a-c, 302a-c. According to one example, the pressure valve 340 may receive the fluid under pressure from the water pump. Accordingly, the tube-shaped container systems 300, 400 offer improved control over conditions that are needed to maintain stationary baitfish using ram ventilation. In open water, fish must swim fast to actively force water through their mouths and across their gills while breathing using ram ventilation. Otherwise, stationary fish actively breathe by pumping their jaws to force water into their mouths and through their gills. The slots 304a-c and the pressure valve 340 may be independently controlled to fine tune an amount of water flowing through the tube sections 312a-c, 302a-c. For example, the slots 304a-c provided in the tube sections 312a-c, 302a-c may be opened to different lengths to support different requirements of baitfish stored therein. Otherwise, if a length of the slots 304a-c is made substantially similar for the tube sections 312a-c, 302a-c, then each baitfish may be subjected to similar conditions within the tube sections 312a-c, 302a-c. Offering a same current flow to different species of baitfish may cause exhaustion or death to some baitfish, while providing ideal conditions for other baitfish. By allowing for different current flows within the different tube sections 312a-c, 302a-c, different species of baitfish may be maintained at optimal conditions within the tube-shaped container systems 100, 300, 400.

According to another example, the tube-shaped container systems 100, 300, 400 may include an oxygen injection system (not shown) that diffuses oxygen into the water supply prior to the water entering the tubes 102, 112, 312a-c, 302a-c. Alternatively, the tube-shaped container systems 100, 300, 400 may include an oxygen injection system such as a diffuser stone within the tubes 102, 112, 312a-c, 302a-c. One of ordinary skill in the art will readily appreciate that the oxygen injection system may be deployed in various locations throughout the tube-shaped container systems 100, 300, 400.

Figure 4:
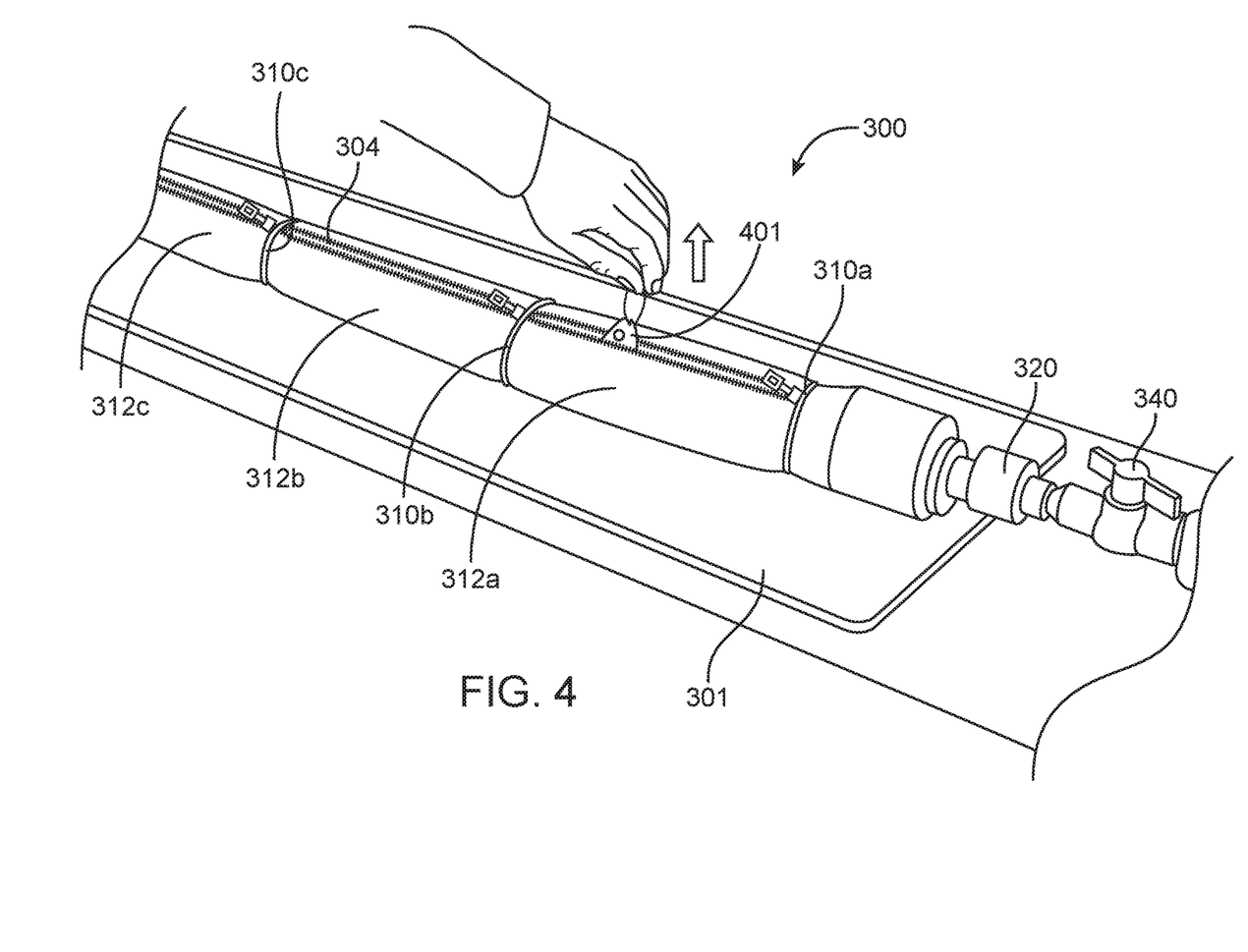
FIG. 4 illustrates a baitfish interacting with the tube-shaped container system according to one example of the technology.
Figure 5:
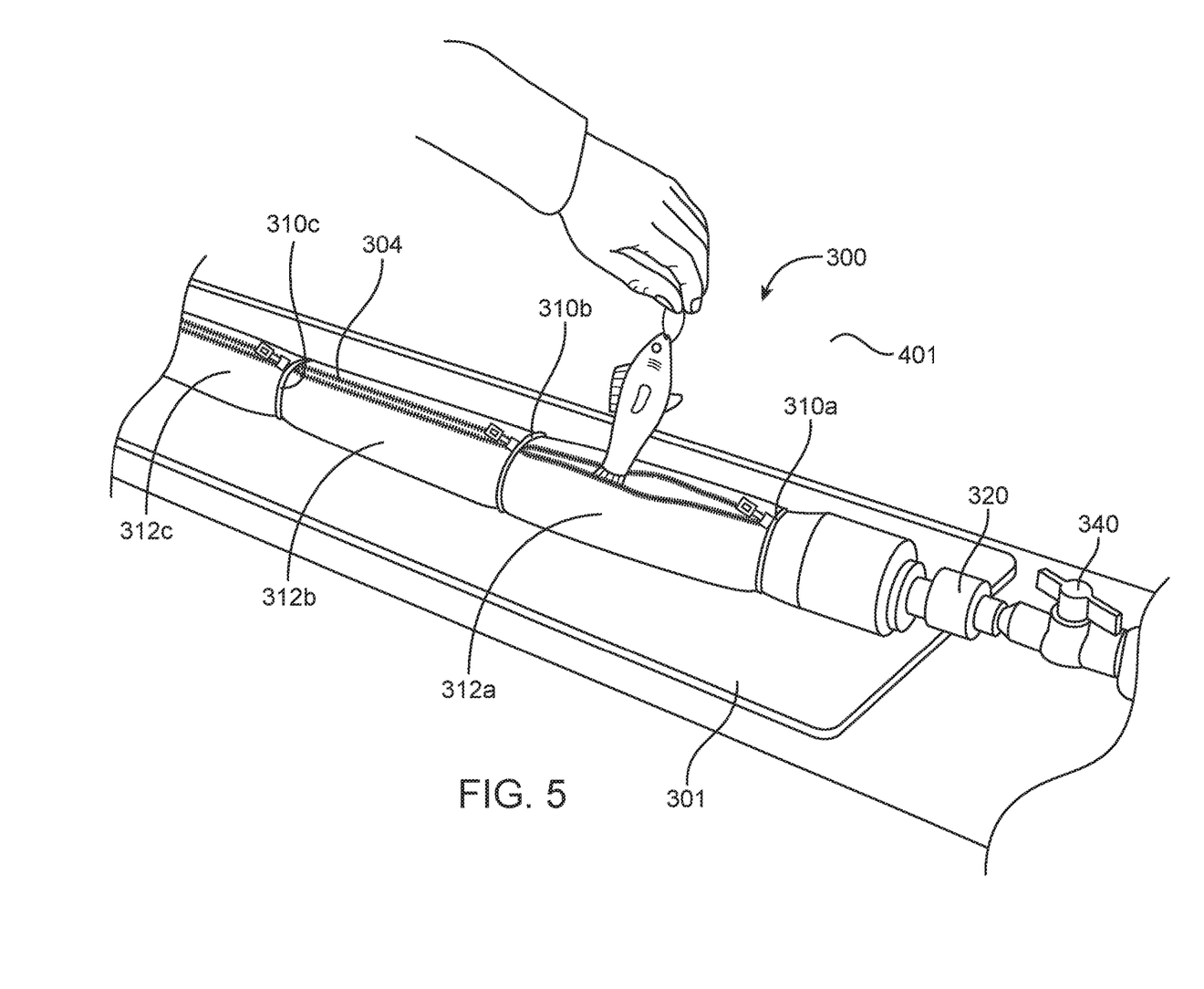
FIG. 5 illustrates a baitfish interacting with the tube-shaped container system according to one example of the technology.
Figure 6:
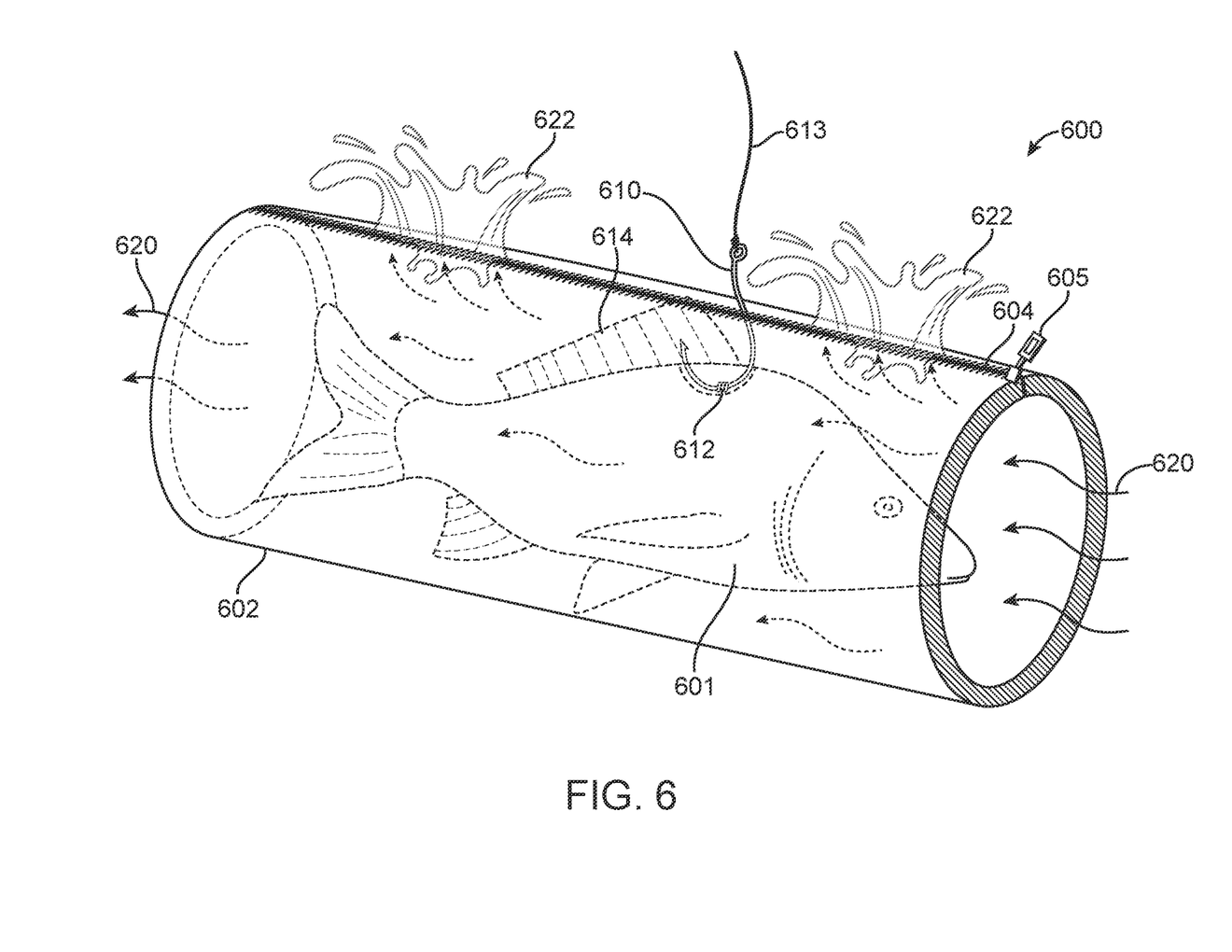
FIG. 6 illustrates a baitfish within the tube-shaped container system according to one example of the technology.

FIGS. 4-6 illustrate examples of how the baitfish 401, 601 interact with the tube-shaped container system 300, 400, 600. FIGS. 4 and 5 illustrate examples of a bridled baitfish 401 being removed through the slot 304a of the tube section 312a. As depicted, the baitfish 401, 601 is oriented such that its mouth points upstream. According to one example, the bridled baitfish 401, 601 may include a hook that secures it to the tube section 312a, 602. According to one example, the bridled baitfish 401, 601 may be detached from a side of the tube section 312a, 602 such that it may be lifted through the slot 304a, 604 by pulling on a leader connected to the bridle. Once the bridled baitfish 401, 601 is removed from the tube section 312a, 602, the leader may be quickly connected to a fishing line and cast into the water.

FIG. 6 illustrates a bridled baitfish 601 provided within an environment of a tube section 602. According to one example, the baitfish 601 is inserted through the slot 604 and rests within the tube section 602 at a location below the slot 604. The baitfish 601 may be secured to a side of the tube section 602 by a hook 610. Typically, the bridle 612 is secured proximate to the dorsal fin 614 and the hook 610 is secured by the bridle 612 to the baitfish 601. The baitfish 601 may be mechanically secured by the hook 610 to a side of the tube section 602 while inside the tube section 602. According to one example, the stationary baitfish 601 may employ ram ventilation using the current 620 that enters the tube section 602 upstream of the baitfish 601 in order to expend minimal energy while breathing. As depicted, the baitfish 601 is oriented such that its mouth points upstream. According to one example, a portion of the water may remain within the tube section 602, while a portion of the water 622 may be ejected through the slot 604. According to one example, dimensions of the tube section 602 may be generally sized to provide a appropriate fit for the baitfish 601.

According to one example, the hook 610 may be removed from the side of the tube section 602 such that the baitfish 601, the hook 610, and the bridle 612 are removed through the slot 604 when a fisherman is ready to place the baitfish 601, the hook 610, and the bridle 612 on the fishing line. At this point, the leader line 613 may be attached to the fishing line and the baitfish 601 may be cast into the water. According to one example, the baitfish 601 may be inserted head first through the slot 604 when the baitfish 601, the hook 610, and the bridle 612 are inserted into the tube section 602 for storage and transportation. Once inserted, the baitfish 601 may be secured by the hook 610 to the side of the tube section 602. The baitfish 601 may remain rested and alert up until the time it is removed for fishing since it is mechanically secured to the tube section 602 and oriented such that its mouth and gills receive oxygenated water.

According to one example, a pressure valve 340 (not shown) is provided upstream of the tube section 602. According to one example, the pressure valve 340 and/or a length of the slot 604 may be adjusted as discussed above to increase or decrease pressure and/or a volume of water flowing through the tube section 602. In this way, the baitfish 601 may be maintained in an optimal environment and may benefit from ram ventilation while being transported in the tube-shaped container systems 100, 300, 400, 600.

One of ordinary skill in the art will readily appreciate that the tube-shaped container systems 100, 300, 400, 600 may be adapted to transport other live aquatic animals. For example, the tube-shaped container systems 100, 300, 400, 600 may be adapted to transport other fish species, including saltwater and freshwater species. Furthermore, the tube-shaped container systems 100, 300, 400, 600 may be adapted to transport any aquatic species that rely on ram ventilation or its equivalent.

While the examples provided herein illustrate tube-shaped container systems, one of ordinary skill in the art will readily appreciate that the horizontally oriented container systems may include other shapes designed to transporting live aquatic animals. According to one example, the horizontally oriented container systems may include a slot that may be opened or closed to regulate a volume or amount of water flowing through the horizontally oriented container system. In this way, the slot allows control over the volume of water passing by the live aquatic animals maintained therein. For example, the slot may be closed or restricted to increase an amount or volume of water flowing through the horizontally oriented container system. Alternatively, the slot may be opened or gapped to decrease an amount or volume of water flowing through the horizontally oriented container system. Any excess water may be dispersed through the slot with minimal disruption to the predominant current flow direction. According to one example, the slot also may be used to deposit or remove the aquatic animals from the horizontally oriented container system. Furthermore, while the horizontally oriented container systems are described for use with fishing vessels, one of ordinary skill in the art will readily appreciate that the horizontally oriented container system may be employed in any environment that requires storage of aquatic animals.

Examples are described above with the aid of illustrations. The boundaries of these constructions have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A system that promotes ram ventilation for aquatic animals stored therein, the system comprising:
    a horizontally oriented container that maintains fluid flow in one predominant direction, the horizontally oriented container having:
        a first end that receives a first volume of fluid;
        a second end that expels a second volume of fluid, the second end being opposite to the first end; and
        a slot that extends along a lengthwise direction of the horizontally oriented container, the slot being provided between the first end and the second end, the slot being positioned along an upper portion of the horizontally oriented container, wherein a length of the slot is adjustable to regulate a pressure or a volume of water flowing through the horizontally oriented container.

2. The system according to claim 1, wherein the horizontally oriented container includes a tube-shaped container.

3. The system according to claim 1, wherein the second volume of fluid is less than the first volume of fluid.

4. The system according to claim 1, wherein the length of the slot is decreased to increase the pressure and the volume of water flowing through the horizontally oriented container and wherein the length of the slot is increased to decrease the pressure and the volume of water flowing through the horizontally oriented container.

5. The system according to claim 1, wherein the slot is dimensioned to receive the aquatic animals therethrough.

6. The system according to claim 5, further comprising a fastener that secures an opening of the slot, wherein the fastener includes a zipper.

7. A system that promotes ram ventilation for aquatic animals stored therein, the system comprising:

a horizontally oriented container that maintains fluid flow in one predominant direction, the horizontally oriented container having:
    a plurality of sections arranged in a serial configuration, each of the plurality of sections having:
        a first end that receives a first volume of fluid;
        a second end that expels a second volume of fluid, the second end being opposite to the first end; and
        a slot that extends along a lengthwise direction of each of the plurality of sections, the slot being provided between the first end and the second end, the slot being positioned along an upper portion of the horizontally oriented container, wherein the second volume of fluid is less than the first volume of fluid.

8. The system according to claim 7, wherein the horizontally oriented container includes a tube-shaped container.

9. The system according to claim 7, wherein a length of the slot is adjustable to regulate a pressure or a volume of water flowing through the horizontally oriented container.

10. The system according to claim 9, wherein the length of the slot is separately adjustable for each of the plurality of sections.

11. The system according to claim 7, wherein a length of the slot is decreased to increase a pressure and a volume of water flowing through the horizontally oriented container and wherein the length of the slot is increased to decrease the pressure and the volume of water flowing through the horizontally oriented container.

12. The system according to claim 7, wherein the slot is dimensioned to receive the aquatic animals therethrough.

13. The system according to claim 12, further comprising a fastener that secures an opening of the slot, wherein the fastener includes a zipper.

14. A system that promotes ram ventilation for aquatic animals stored therein, the system comprising:
    a water pump;
    a pressure valve that receives a fluid from the water pump under pressure;
    a horizontally oriented container that maintains fluid flow in one predominant direction, the horizontally oriented container having:
        a plurality of sections arranged in a serial configuration, each of the plurality of sections having:
            a first end that receives a first volume of fluid;
            a second end that expels a second volume of fluid, the second end being opposite to the first end; and
            a slot that extends along a lengthwise direction of each of the plurality of sections, the slot being provided between the first end and the second end, the slot being positioned along an upper portion of the horizontally oriented container,
    wherein a pipe fluidly couples adjacent sections of the plurality of sections, and
    wherein a length of the slot is adjustable to regulate a pressure or a volume of water flowing through the plurality of sections.

15. The system according to claim 14, wherein the horizontally oriented container includes a tube-shaped container.

16. The system according to claim 14, wherein the second volume of fluid is less than the first volume of fluid.

17. The system according to claim 14, wherein the length of the slot is decreased to increase the pressure and the volume of water flowing through the plurality of sections and wherein the length of the slot is increased to decrease the pressure and the volume of water flowing through the plurality of sections.

\* \* \* \* \*